(12) United States Patent
Sakamoto et al.

(10) Patent No.: US 7,929,209 B2
(45) Date of Patent: Apr. 19, 2011

(54) OPTICAL ELEMENT AND METHOD OF MANUFACTURING OPTICAL ELEMENT WITH EACH OF FIRST AND SECOND LAYERS HAVING A REPETITION STRUCTURE

(75) Inventors: Jun-ichi Sakamoto, Yokohama (JP); Junji Terada, Tokyo (JP); Noriyuki Nakai, Machida (JP); Kazuhiro Arai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 11/677,235

(22) Filed: Feb. 21, 2007

(65) Prior Publication Data
US 2007/0201135 A1   Aug. 30, 2007

(30) Foreign Application Priority Data

Feb. 28, 2006   (JP) .................................. 2006-052013
Feb. 13, 2007   (JP) .................................. 2007-032708

(51) Int. Cl.
*G02B 5/30* (2006.01)
(52) U.S. Cl. .................................................. 359/485.05
(58) Field of Classification Search .................... 359/486
See application file for complete search history.

(56) References Cited

U.S. PATENT DOCUMENTS

| 4,662,746 | A | 5/1987 | Hornbeck ..................... 350/269 |
| 4,957,358 | A | 9/1990 | Terada et al. ................. 350/588 |
| 5,440,421 | A | 8/1995 | Fan et al. ..................... 359/344 |
| 5,725,959 | A | 3/1998 | Terada et al. ................. 428/448 |
| 5,998,298 | A | 12/1999 | Fleming et al. ............... 438/692 |
| 6,358,854 | B1 | 3/2002 | Fleming et al. ............... 438/692 |
| 6,785,050 | B2 * | 8/2004 | Lines et al. ................... 359/486 |
| 6,788,461 | B2 | 9/2004 | Kurtz et al. ................... 359/486 |
| 2003/0128733 | A1 | 7/2003 | Tan et al. ....................... 372/96 |
| 2003/0132705 | A1 | 7/2003 | Gee et al. ...................... 313/569 |
| 2003/0209716 | A1 | 11/2003 | Kito et al. ....................... 257/79 |
| 2005/0088739 | A1 | 4/2005 | Chiu et al. .................... 359/486 |

FOREIGN PATENT DOCUMENTS

EP            1 328 049 A2      7/2003

(Continued)

OTHER PUBLICATIONS

Mar. 7, 2008 Chinese Official Action translation in Chinese Patent Appln. No. 200710085082.4.

(Continued)

*Primary Examiner* — Stephone B Allen
*Assistant Examiner* — Derek S Chapel
(74) *Attorney, Agent, or Firm* — Fitzpatrick, Cella, Harper & Scinto

(57) ABSTRACT

An optical element having a three-dimensional structure which can function in a visible range and can improve adherence at a structural interface of the element, and a method of manufacturing the optical element. The optical element includes a substrate, and at least a first layer and a second layer on the substrate are manufactured such that each of the first layer and the second layer has a repetition structure of spaces and structural parts at a pitch equal to or less than a wavelength of visible light, and at an interface between the first layer and the second layer, overlapped structures are provided in which the repetition structure of the first layer and the repetition structure of the second layer overlap in a stack direction of the layers.

5 Claims, 10 Drawing Sheets

FOREIGN PATENT DOCUMENTS

| | | |
|---|---|---|
| JP | 03-271296 | 12/1991 |
| JP | 08-12600 | 1/1996 |
| JP | 09-157463 | 6/1997 |
| JP | 10-72579 | 3/1998 |
| JP | 11-8068 | 1/1999 |
| JP | 11-040357 | 2/1999 |
| JP | B2 3008897 | 2/2000 |
| JP | 2000-284136 | 10/2000 |
| JP | 2001-074954 | 3/2001 |
| JP | 2001-074955 | 3/2001 |
| JP | 2001-284050 | 10/2001 |
| JP | 2006-056958 | 3/2006 |
| WO | WO 02/12933 A2 | 2/2002 |

OTHER PUBLICATIONS

Jun. 6, 2007 European Search Report in European Patent Appln. No. 07103029.

T.E. Sale, et al., "Room Temperature Visible (683-713 nm) All-AlGaAs Vertical-Cavity Surface-Emitting Lasers (VCSEL's)", IEEE Photonics Technology Letters, vol. 8, No. 4, Apr. 1996, pp. 473-475.

Sep. 24, 2009 European Search Report in European Patent Appln. No. 07 103 029.0.

Georg von Freymann, et al., "Sub-nanometer precision modification of the optical properties of three-dimensional polymer-based photonic crystals", Photonics and Nanostructures Fundamentals and Applications, vol. 2, 2004, pp. 191-198.

T. Katsuyama, et al., "Woodpile photonic crystals composed of air columns", Photonics and Nanostructures Fundamentals and Applications, vol. 4, No. 1, Feb. 2006, pp. 54-58.

* cited by examiner

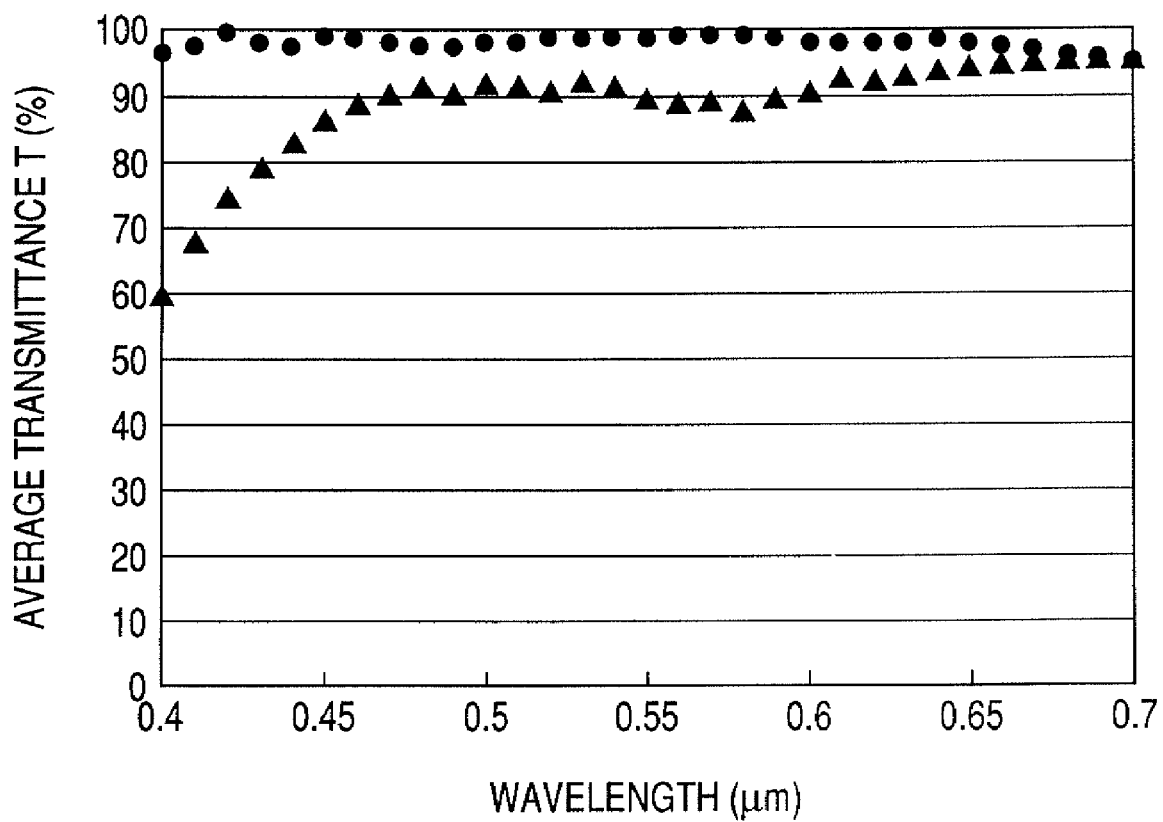

OPTICAL ELEMENT AND METHOD OF MANUFACTURING OPTICAL ELEMENT WITH EACH OF FIRST AND SECOND LAYERS HAVING A REPETITION STRUCTURE

BACKGROUND OF THE INVENTION

1. Field of the Invention

The present invention relates to an optical element and a method of manufacturing the optical element. In particular, the present invention relates to an optical element having a three-dimensional hollow structure such as a polarizing beam splitter, a phase plate, or a band-pass filter which has on a surface thereof a structure with an in-plane period shorter than a wavelength of visible light, and a method of manufacturing the same.

2. Description of the Related Art

In recent years, optical components having a three-dimensional hollow structure are actively proposed. To obtain such a three-dimensional hollow structure will be essential for improving functions of the optical components in the future. However, a structure of the optical components is on the order of nanometers, a manufacturing method thereof has not been established, and there are many practical problems with regard to strength of the element and the like. In order to obtain such a three-dimensional hollow structure, there is a method using a sacrificial layer to manufacture a hollow structure on the order of micrometers, that is, so-called MEMS (Micro Electro Mechanical Systems) (see U.S. Pat. No. 4,662,746).

Such a MEMS structure provides a digital mirror device. The digital mirror device has a hinge for receiving an operating mirror, a yoke for receiving external forces formed on the hinge, and a mirror for deflecting external light formed on the yoke. This structure is sized to be several microns to several hundred microns, the adhesion between an upper layer and a lower layer is adequate, and no practical problem is caused.

Further, Japanese Patent Application Laid-Open No. 2001-074955 discloses a structure of a photonic crystal waveguide and a method of manufacturing the same. A photonic crystal waveguide is intended to obtain a three-dimensional waveguide by forming structural defects in layers having a line-and-space structure and stacking them in directions orthogonal to one another. According to the manufacturing method disclosed here, a semiconductor material is used to conduct mass transportation of a semiconductor element at a high temperature to form a junction. At such a material junction, metallic bond or covalent bond is possible, and the upper layer and the lower layer can be strongly adhered to each other.

A semiconductor material is transparent in an infrared range but opaque in a visible range, and thus, such a semiconductor material cannot be used for an optical element which functions in the visible range. Therefore, it is necessary to use dielectric materials. However, when dielectric materials are heated to a high temperature, it is sometimes difficult to conduct mass transportation of an element between the dielectric materials to form a junction. In this way, depending on the material, it is sometimes difficult to form a junction by heat. Further, when it is attempted to obtain a stacked bottom-up structure using a sacrificial layer process, in the case of a nanometer structure of the wavelength equal to or less than that of visible light, the contact area between an upper layer and a lower layer becomes extremely small. Therefore, a problem is caused in that the adhesion at the interface between the layers is extremely small and the element is very vulnerable.

The present invention has been made in view of the above-mentioned problems. An object of the present invention is to provide an optical element having a three-dimensional structure which can function in the visible range and can improve the adhesion at a structural interface of the element, and a method of manufacturing the optical element.

SUMMARY OF THE INVENTION

In order to solve the above-mentioned problems, according to the present invention, an optical element having a three-dimensional structure formed as in the following and a method of manufacturing the optical element are provided.

According to the first aspect of the present invention, there is provided an optical element, including: a substrate, and a first layer and a second layer formed on the substrate, wherein each of the first layer and the second layer comprises a repetition structure of spaces and structural parts at a pitch equal to or less than a wavelength of visible light in a vertical direction to a stack direction of the layers, and wherein, the repetition structure of the first layer and the repetition structure of the second layer overlap at an interface between the first layer and the second layer, in a stack direction of the layers.

The optical element according to the first aspect of the present invention can further include a plurality of layers between the substrate and the first layer, and in the optical element, the first layer can be formed of an i-th layer and the second layer can be formed of an (i+1)th layer as counted from the substrate.

In the optical element according to the first aspect of the present invention, in the overlapped structures, the repetition structure of the first layer and the repetition structure of the second layer can overlap in a range of 3 nm or more and 20 nm or less.

In the optical element according to the first aspect of the present invention, each repetition structure of the first layer and the second layer can include any one of a line-and-space structure, a structure with holes, and a structure with dots.

In the optical element according to the first aspect of the present invention, the pitch equal to or less than the wavelength of visible light in the first layer and the second layer can be 10 nm or more and 200 nm or less.

In the optical element according to the first aspect of the present invention, the repetition structure of the first layer and the repetition structure of the second layer can be formed of the same material.

In the optical element according to the first aspect of the present invention, the repetition structure of the first layer and the repetition structure of the second layer can be formed of a dielectric material.

According to the second aspect of the present invention, a method of manufacturing an optical element including a substrate, and a first layer and a second layer formed on the substrate, the method including the steps of: forming the first layer on the substrate, processing in the first layer a repetition structure comprised of spaces and structural parts, having a pitch equal to or less than a wavelength of visible light, filling the spaces in the repetition structure with a material of a sacrificial layer, etching the sacrificial layer to expose an upper portion of the repetition structure from the sacrificial layer, forming the second layer on the repetition structure and the sacrificial layer, processing in the second layer a repetition structure of spaces and structural parts, having a pitch equal to or less than a wavelength of visible light, and removing the sacrificial layer.

In the method of manufacturing an optical element according to the second aspect of the present invention, in the step of exposing the upper portion of the repetition structure from the sacrificial layer, the side surfaces of the repetition structure can be exposed in a range of 3 nm or more and 20 nm or less from an upper surface of the repetition structure.

According to the present invention, the adhesion between an upper layer and a lower layer on a substrate can be improved, and poor adhesion can be prevented. Further, in a manufacturing process or the like, when, for example, external forces act, problems peculiar to a microstructure such as pattern collapse can be prevented.

Other features and advantages of the present invention will be apparent from the following description taken in conjunction with the accompanying drawings.

BRIEF DESCRIPTION OF THE DRAWINGS

FIG. 7 is a graph illustrating average transmittance of the phase plate according to Example 3 of the present invention and that of a phase plate according to Comparative Example 2.

DESCRIPTION OF THE EMBODIMENTS

Figure 1A:
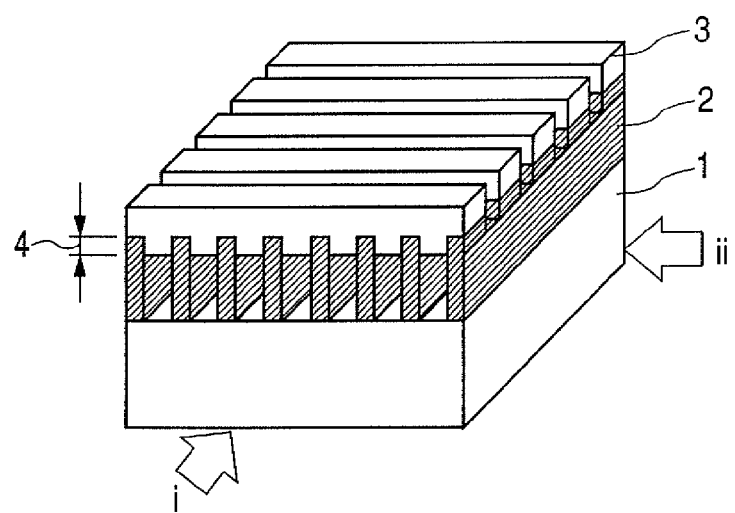
FIGS. 1A, 1B, and 1C are schematic views for illustrating a configuration of an optical element having a three-dimensional structure according to an embodiment of the present invention.
Figure 1B:
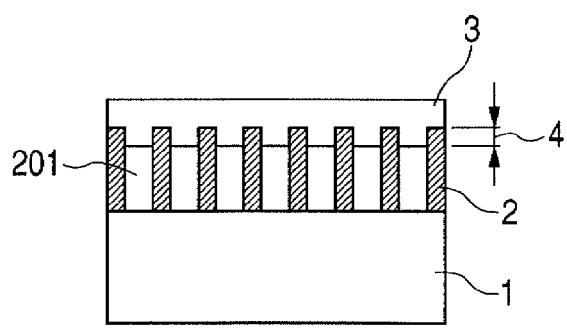
Figure 1C:
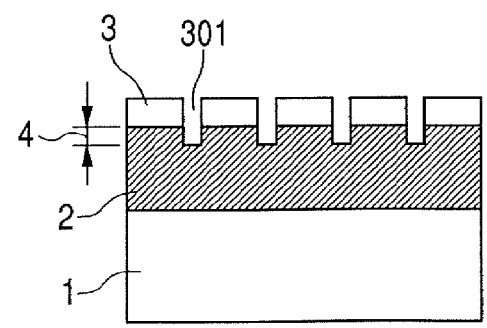

The embodiment of the present invention will be described below. FIGS. 1A to 1C are schematic views for illustrating a configuration of an optical element having a three-dimensional structure according to this embodiment. FIG. 1A is a perspective view, FIG. 1B is a cross-sectional view seen from a direction indicated by the arrow i, and FIG. 1C is a cross-sectional view seen from a direction indicated by the arrow ii. In this embodiment, as shown in FIGS. 1A to 1C, an optical element includes a stacked structure in which a repetition structure of spaces (air gaps) 201 and structural parts 202 of the first layer (a first structure) 2 and a repetition structure of the second layer (a second structure) 3 of spaces (air gaps) 301 and structural parts 303 are stacked on a substrate 1. In this case, a plurality of layers may be provided between the substrate 1 and the first structure 2, and the structure 2 may be provided as an i-th layer counting from the substrate. Further, a plurality of layers may be provided as an upper layer on the second structure 3.

Here, when the structure 2 is formed of the i-th layer counting from the substrate, each of the i-th layer and an (i+1)th layer is processed of a repetition structure of spaces and structural parts at a pitch equal to or less than the wavelength of visible light in a vertical direction to a stack direction of the layers. At an interface between those layers, the pattern structures overlap in a stack direction thereof. More specifically, at the interface between the i-th layer (first structure 2) and the (i+1)th layer (second structure 3), a repetition structure having a pitch equal to or less than the wavelength of visible light of the i-th layer and a repetition structure having a pitch equal to or less than the wavelength of visible light of the (i+1)th layer overlap in a stack direction thereof. In other words, the repetition structures engage into each other. The state that the repetition structures engage into each other is hereinafter referred to as "overlapped state", and the structures which engage into each other are hereinafter referred to as "overlapped structures". Further, a portion 4 where the structures engage into each other is hereinafter referred to as "overlapped portion".

According to this embodiment, the overlapped structures can make larger the contact area between the i-th layer and the (i+1)th layer, which makes it possible to improve the adhesion between the layers. Further, the existence of such an overlapped portion can prevent minute structural defects such as pattern collapse. Here, at the interface between the above-mentioned i-th layer (the first structure 2) and the (i+1)th layer (the second structure 3), the overlapped portion 4 where the overlapped state is the largest is preferably in the range of 3 nm or more and 20 nm or less. In the case where the largest overlap portion is less than 3 nm, when an in-plane distribution in manufacturing is not uniform, there is a possibility that poor adhesion is partially caused. Further, in the case where the largest overlap portion is less than 3 nm, the contact area between the upper and lower layers is small, and adequate adhesion strength cannot be obtained. On the other hand, when the largest overlapped portion is more than 20 nm, planarity of the (i+1)th layer is inadequate, and optically adverse effects such as light scattering are generated. Further, because the refractive index of the overlapped portion is a value between that of the i-th layer and that of the (i+1)th layer, an optically thick overlapped portion cannot obtain desired characteristics.

Figure 11:
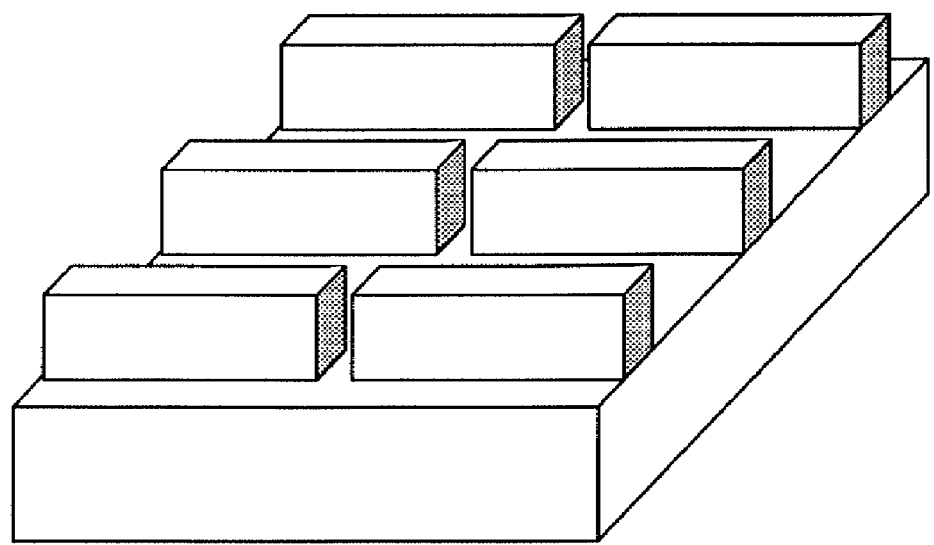
FIG. 11 is a view illustrating an exemplary pattern of a line-and-space structure.

Further, in this embodiment, the above-mentioned repetition structures having a pitch equal to or less than the wavelength of visible light of the i-th layer and the (i+1)th layer can be formed as any one of a line-and-space structure, a structure with holes, and a structure with dots. In the case of a line-and-space structure, a pattern is anisotropic with regard to a polarized component of light, and thus, it is an effective structure in obtaining a configuration such as a polarizing beam splitter or a low-pass filter. Further, lines of the line-and-space structure may be divided at a pitch equal to or less than the wavelength of visible light (see FIG. 11). By the division, peeling off of the pattern due to a layer stress can be prevented. Further, in the case of a structure with dots where the pattern is a column-shape or a structure with holes where the pattern is a hole-shape, the pattern is isotropic with regard to a polarized component of light, and thus, it is effective as a component of an antireflection film of a multilayer interference film or of a band-pass filter.

Here, by making the pitch of the repetition structures equal to or less than the wavelength of visible light, a diffraction phenomenon at a wavelength used for the optical element can be prevented, and thus, optically stable characteristics can be obtained. Here, it is desirable that the pitch of the repetition structures is 10 nm or more and 200 nm or less. In particular, when the pitch is 150 nm or less, diffraction light is not generated in an optical element using an incident angle of 45° which functions in a visible light region where the wavelength is 400 nm or more, and thus, the optical element functions effectively. If the pitch is less than 10 nm, it is difficult to maintain the structures as such. Further, effectiveness of a layer formed of spaces (hereinafter referred to as "air gaps") and structural parts particularly resides in that a desired refractive index can be obtained. Generally, each material has its own refractive index, and it is difficult to obtain an arbitrary refractive index. However, when a layer is formed of air gaps and structural parts, an arbitrary refractive index can be obtained by controlling the ratios of the air gaps and the structural parts.

More specifically, the refractive index can be theoretically controlled to be in a range from the refractive index of the material of the structures to a value larger than the refractive index of air, i.e., larger than 1. In particular, the refractive index of magnesium fluoride which can be stably used as a layer having a low refractive index is 1.38. However, when silicon oxide (refractive index: 1.46) is used as the structures and the ratio of the air gaps is 90 percent, and a structure with holes is formed, the refractive index is 1.146, and thus, a layer having a very low refractive index which cannot be attained with a dielectric can be obtained. Further, when a line-and-space structure is formed also with a ratio of the air gaps of 90 percent, the refractive index becomes still lower and anisotropy of the refractive index appears. The refractive index with regard to an electric field (vibration component of light in parallel with the direction of the lines) is 1.055 while the refractive index with regard to a magnetic field (vibration component of light perpendicular to the direction of the lines) is 1.028.

Further, in this embodiment, the structural material of the i-th layer and of the (i+1)th layer can be the same. When the structural material of the i-th layer and the (i+1)th layer are the same in this way, because the influence of an refractive index in between the layers described above can be neglected, it is easier to obtain desired characteristics. Further, in this embodiment, a dielectric can be used for the structural material. It is desirable that the material of an optical element which functions in the visible range does not absorb light in the visible range. Many dielectrics are transparent in the visible range, and effective as the structural material of the optical element according to the present invention. In particular, silicon oxide, titanium oxide, tantalum pentoxide, zirconium oxide, and the like are effective materials because they are easily etched in an etching process.

Next, a method of manufacturing an optical element having a three-dimensional structure according to this embodiment is described. First, in a process of forming the repetition structure of the i-th layer, having a pitch equal to or less than the wavelength of visible light, after patterning is carried out using photolithography, etching is carried out. In the photolithography, exposure may be carried out by any method which is not limited particularly as long as it can obtain a desired pitch, for example, a stepper, an Electron Beam drawing equipment, an X-ray exposing apparatus, or an interference exposing apparatus. Further, since the etched structures are minute, it is desirable to use dry etching. The dry etching can be carried out by any method which is not limited particularly as long as it can obtain a desired pitch, and the dry etching may be, for example, RIE (Reactive Ion Etching), ICP (Inductively Coupled Plasma), or NLD (Neutral Loop Discharge). Wet etching may also be carried out as long as a desired pitch can be obtained. When a dielectric is etched with a resist using as the mask, selectivity is sometimes a problem. In this case, it is desirable that the mask for etching the structures is a multi-layered mask such that the selectivity can be obtained.

Next, a process of filling the spaces with a material of a sacrificial layer can be carried out by applying a commonly used coating technique. For example, spin coating, spray coating, or slit coating may be used. Further, the material of the sacrificial layer may be any material which can be ashed with oxygen, such as a photoresist material, a BARC (Bottom Anti—Reflection Coating) material, an acrylic resin, or a polystyrene resin. Further, in order to improve the planarity of the surface of the sacrificial layer, it is desirable that the thickness from an upper surface of the structures is large. On the other hand, in order to make shorter the time necessary for a planarizing process, it is desirable that the thickness is small. Therefore, it is desirable that the thickness of the sacrificial layer from the upper surface of the structures is 50 nm or more and 200 nm or less. In order to improve the planarity of the sacrificial layer, it is effective to apply the sacrificial layer for multiple times.

Next, it is desirable that in a process of etching (etching back) the whole surface of the sacrificial layer to expose an upper portion of the i-th repetition structures from the sacrificial layer, commonly used dry etching is employed. For example, a parallel plate type RIE apparatus may be used. A side surface of the repetition structures in a range of 3 nm or more to 20 nm or less from the upper surface of the repetition structures is exposed from the sacrificial layer. The amount of the etching can be controlled by the etching time. Here, oxygen is used as an etching gas. When the oxygen is pure oxygen, because the etching rate is high, controllability of the etching amount may become bad. By mixing $CF_4$ or $CHF_3Cl$ gas with oxygen, the etching rate can be made lower to improve the controllability of the etching amount.

Next, a process of forming the (i+1)th layer on the i-th layer may be carried out by using a commonly used film forming technique. For example, vapor deposition, sputtering, or CVD may be used. It is to be noted that, in order not to allow the sacrificial layer to be deformed or deteriorated in quality, the process temperature has to be controlled. Next, a process of forming the repetition structures of the (i+1)th layer, having a pitch equal to or less than the wavelength of visible light, is carried out similarly to the case of the i-th layer. Because the etching is carried out until the sacrificial layer is exposed, the upper portion of the i-th layer pattern is etched to a depth equal to the range of the height of the overlapped portion (see the reference numeral 4 of FIG. 1C). Alternatively, the upper portion of the i-th layer pattern may be etched in a range of the height of the overlap portion or more as far as the optical characteristics permit. This forms a difference in level between the i-th pattern and the (i+1)th pattern, and thus, it is easier to remove the sacrificial layer. Finally, a process of removing the sacrificial layer which fills the spaces in the i-th layer may be carried out by dry etching. For example, commonly used etching with an RIE apparatus using pure oxygen may be used. Alternatively, an ashing apparatus solely for the resist may be used. This process can also be controlled by the time. By the method described above, an optical element having a three-dimensional structure can be obtained.

As described above, according to this embodiment, the adhesion between an upper layer and a lower layer on the substrate can be improved, and a poor adhesion can be prevented. Further, in a manufacturing process or the like, for example, when external forces act, problems peculiar to a microstructure, such as pattern collapse, can be prevented. Still further, when a large area with a diameter of 6 inches, 8 inches, or the like is processed at the same time, because the whole surface can be effectively used, the number of elements which can be obtained from the area becomes larger, which enables efficient production. Further, while a thick overlapped portion affects optical characteristics, by making the overlapped portion in a range of 20 nm or less, desired optical characteristics can be easily obtained.

Examples of the present invention are now described in the following.

EXAMPLE 1

Figure 2:
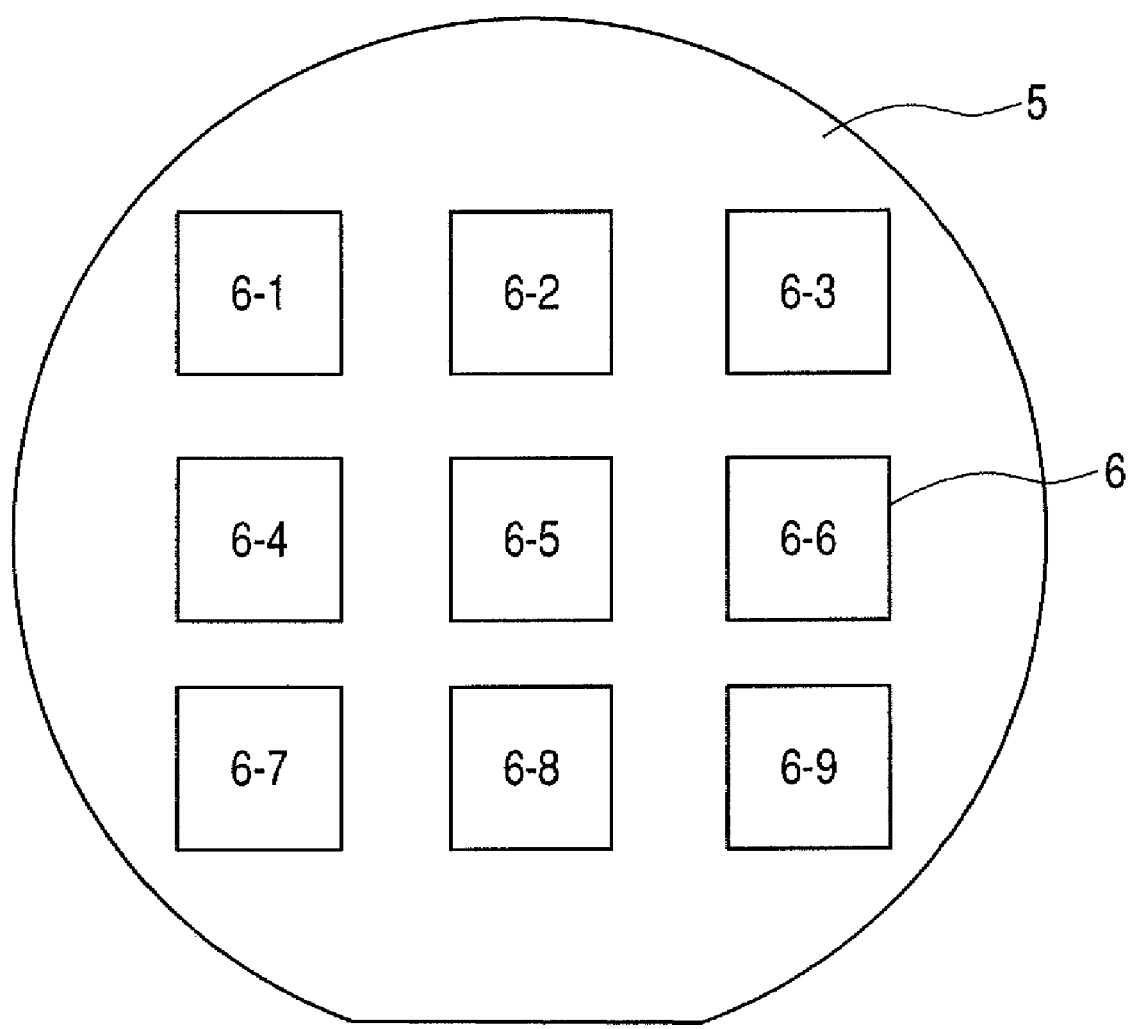
FIG. 2 is a diagram illustrating a substrate and a pattern arrangement according to Example 1 of the present invention.
Figure 3A:
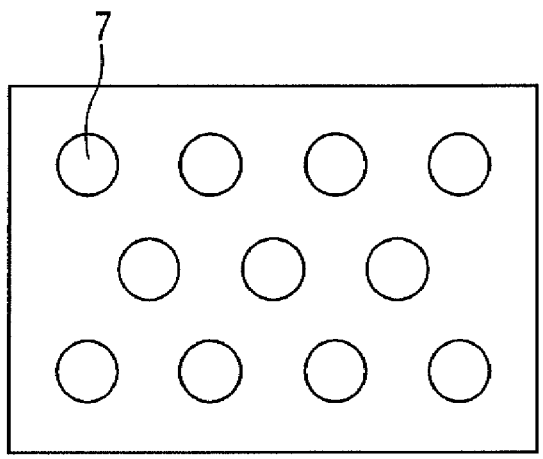
FIGS. 3A and 3B are diagrams illustrating pattern shapes of a first layer and a second layer of a three-dimensional structure of an optical element according to Example 1 of the present invention.
Figure 3B:
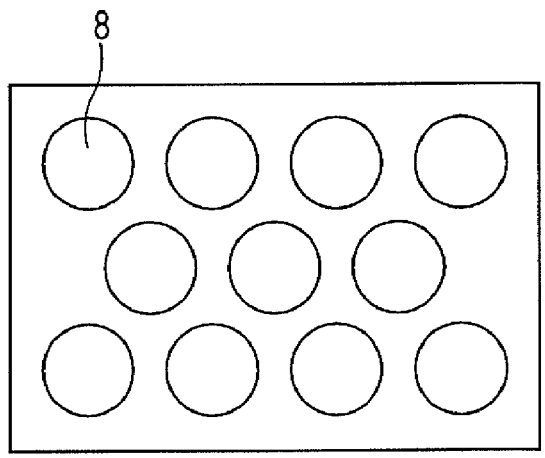

First, a substrate and a pattern arrangement of a three-dimensional structure of an optical element of this example are described with reference to FIG. 2 and FIGS. 3A and 3B. Nine patterns 6 each of which has a size of 25 mm×25 mm were patterned on a substrate 5 which is a 6-inch quartz wafer. Here, as illustrated in FIG. 3A, the patterns in the first layer were at a pitch of 0.26 µm, the diameter of the hole patterns 7 was 0.13 µm, and the hole patterns 7 were arranged at vertices of regular triangles. As illustrated in FIG. 3B, the patterns in the second layer were at a pitch of 0.26 µm, the diameter of the hole patterns 8 was 0.2 µm, and the hole patterns 8 were arranged at vertices of regular triangles. Although, in this example, the holes were formed using the same mask and the hole diameters were controlled by the amount of exposure, the mask may be changed.

Figure 4A:
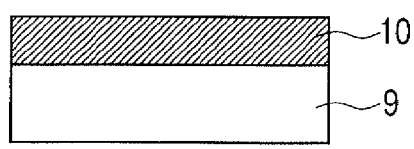
FIGS. 4A, 4B, 4C, 4D, 4E, 4F, 4G, 4H and 4I are schematic cross-sectional views for illustrating a manufacturing process of the optical element having the three-dimensional structure according to Example 1 of the present invention.

Next, a manufacturing process of the optical element having the three-dimensional structure is described. FIGS. 4A to 4I illustrate the manufacturing process of the optical element according to this example. First, patterning of the first layer is described. After a 6-inch quartz wafer substrate 9 was cleaned and dried, a silicon oxide film was formed to have a thickness of 100 nm by sputtering to form a silicon oxide layer 10. As a result, the layer for forming the structure of the first layer was obtained (FIG. 4A). Then, a photolithography step for patterning the silicon oxide layer 10 was carried out. Here, as a photoresist for the patterning, Clariant AX6850P was used. The resist was applied by spin coating, and the coating was carried out such that the thickness of the film was 300 nm. After the coating, prebaking was carried out at 110° C. for two minutes. Then, exposure was carried out with a stepper FPA-5000-ES4b manufactured by Canon Inc. As for the exposure pattern, hole patterns at a pitch of 0.26 µm were used in the 25 mm×25 mm area. The diameter of the holes was 0.13 µm and the hole patterns were arranged at vertices of regular triangles. The amount of exposure in this case was 32 mJ/cm$^2$. The exposure was carried out at nine points in the 6-inch substrate. After the exposure, PEB (Post Exposure Bake) was carried out at 120° C. for two minutes.

Figure 4B:
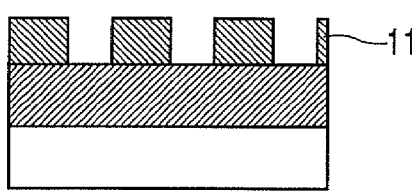
Figure 4C:
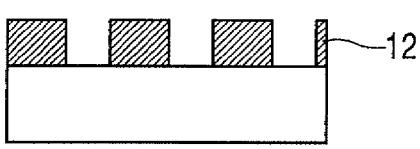

Then, the substrate having the structure of the first layer was soaked in a developer containing 2.38% of TMAH (tetramethyl ammonium hydroxide) for one minute, and the developer was rinsed out by pure water shower to obtain hole patterns 11 of the resist (FIG. 4B). Then, the silicon oxide layer was etched. The etching was carried out by a parallel plate type RIE apparatus with CHF$_3$ used as an etching gas under a pressure of 2.7 Pa with an RF power of 100 W (0.3 W/cm$^2$) for 4.3 minutes. Further, in order to remove residual resist, ashing was carried out with oxygen gas used as an etching gas under a pressure of 2.7 Pa with an RF power of 100 W for one minute. In this way, silicon oxide hole patterns 12 were obtained with a hole depth of 100 nm (FIG. 4C).

Figure 4D:
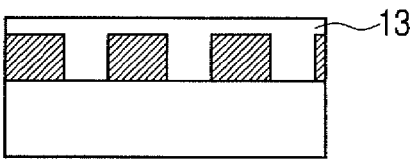
Figure 4E:
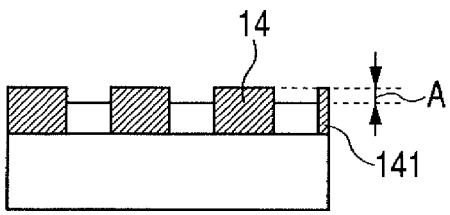

Next, filling and planarizing steps are described. As a filling material, AZ Exp. KrF-17C8 manufactured by Clariant Company was used. The filling was carried out by spin coating. After the spin coating at 2500 rpm for thirty seconds, prebaking was carried out at 180° C. for one minute. This was repeated two times to complete the filling (FIG. 4D). As a result, a planarized interface 13 of the filled layer was obtained at a position of 50 nm above an upper surface 14 of the silicon oxide hole patterns. Planarization was carried out with an apparatus similar to that used for the etching. Ashing was carried out with a mixture of oxygen gas (17 vol %) and CHF$_3$ (83 vol %) used as an etching gas under a pressure of 3 Pa with an RF power of 20 W (0.06 W/cm$^2$) for 5.5 minutes. Measurement by an AFM clarified that a planarized substrate (FIG. 4E) was obtained with an exposed amount of the structure of silicon oxide (which is the height of the side surfaces 141 of the silicon oxide patterns exposed from an upper surface of the sacrificial layer to the upper surface 14 of the patterns, as indicated by reference symbol A in FIG. 4E) being 3 nm.

Figure 4F:
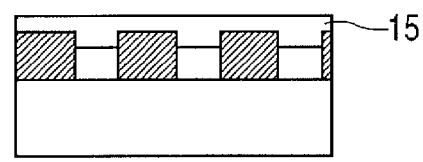
Figure 4G:
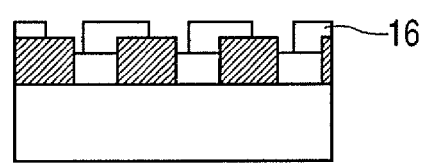

Next, patterning of the second layer is described. In patterning the second layer, a silicon oxide film was formed as the second layer for the substrate to have a thickness of 10 nm by sputtering. As a result, a continuous and uniform silicon oxide layer 15 with sufficient planarity was able to be obtained (FIG. 4F). Then, a photolithography step for patterning the second silicon oxide layer was carried out. This was carried out similarly to the case of the first silicon oxide layer except that the amount of exposure was 50 mJ/cm$^2$. The patterns after the development were at a pitch of 0.26 µm and the diameter of the holes was 0.2 µm. Then, the second silicon oxide layer was etched similarly to the case of the first silicon oxide layer except that the etching time was 0.5 minutes. Further, in order to remove residual resist, ashing was carried out with oxygen gas used as an etching gas under a pressure of 2.7 Pa with an RF power of 100 W for one minute. In this way, silicon oxide hole patterns 16 were obtained with a hole depth of 10 nm (FIG. 4G). FIG. 4G shows a schematic cross-sectional view taken along the line a-a' of FIG. 4I.

Figure 4H:
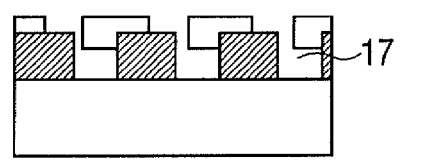
Figure 4I:
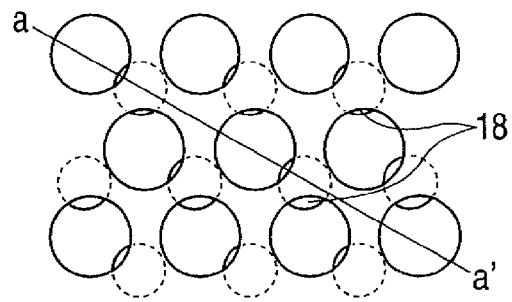

Next, ashing of the sacrificial layer is described. The ashing of the sacrificial layer was carried out using an RIE apparatus utilizing oxygen gas under a pressure of 3 Pa with a power of 100 W for three minutes. The sacrificial layer filling the holes in the first layer was removed to obtain hollow structure 17 (FIG. 4H). The sacrificial layer was vaporized by plasma and removed from very minute gaps 18 (FIG. 4I). The material of the sacrificial layer is required to have the following material characteristics. That is, the material needs to be solid at ordinary temperatures, and when dissolved in an organic solvent, the material needs to be a material which can be made into a thin film by spin coating or spray coating. Basically any material which can be decomposed into a gas having a high vapor pressure by using oxygen plasma can be used. In this way, the two-layered three-dimensional structure of silicon oxide was obtained. With regard to all the nine patterns in the 6-inch surface, the 25 mm×25 mm areas where the patterns were formed appeared to be uniform, and, even after nitrogen blow of 0.5 MPa was carried out, the appearance did not change, and it was a satisfactory structure. Further, observation of a section taken along the center of the pattern with an FE-SEM confirmed that, at the interface between the first layer and the second layer, the two layers were strongly adhered to each other.

EXAMPLE 2

In Example 2, the planarizing step was carried out for six minutes. After the planarization, the upper portion of the silicon oxide structure was exposed by 20 nm. The second silicon oxide layer had a thickness of 70 nm, and the second silicon oxide layer was etched for 3.5 minutes. In the same conditions as in Example 1 except for the above, a two-layered three-dimensional structure of silicon oxide was obtained. After the process of forming the second silicon oxide layer, a section was observed. The result was that, although the surface had a concave-convex height of about 5 nm, a continuous film was formed and post processes was able to be carried out similarly. With regard to all the nine patterns in the 6-inch surface, the 25 mm×25 mm areas where the patterns were formed appeared to be uniform, and, even after nitrogen blow of 0.5 MPa was carried out, the appearance did not change, and it was a satisfactory structure. Further, observation of a section taken along the center of the pattern with an FE-SEM confirmed that, at the interface between the first layer and the second layer, the two layers were strongly adhered to each other.

EXAMPLE 3

Figure 5A:
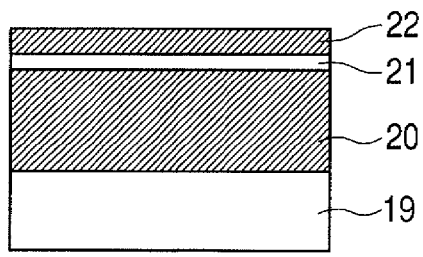
FIGS. 5A, 5B, 5C, 5D, 5E, 5F, 5G, 5H and 5I are schematic cross-sectional views for illustrating a manufacturing process of an optical element having a three-dimensional structure according to Example 3 of the present invention.

In Example 3, similarly to the case of Example 1, an optical glass substrate which is a 6-inch wafer was used to carry out exposure at nine points. FIGS. 5A to 5I are views for illustrating a manufacturing process of a three-dimensional structure of an optical element according to this example. First, an S-TIH53 optical glass substrate 19 manufactured by Ohara Inc. was cleaned, and then, vapor deposition of a tantalum pentoxide layer 20 was carried out such that the film thickness was 960 nm (FIG. 5A). Then, as a mask material for etching tantalum pentoxide, a WSi layer 21 was formed by sputtering. Then, as a mask material for etching the WSi layer 21, a silicon oxide layer 22 was formed. The multilayer mask layer is effective when, in an etching step described below, appropriate selectivity cannot be secured between a photoresist and a layer to be etched. The thickness of the WSi layer and the thickness of the silicon oxide layer were 200 nm and 120 nm, respectively.

Then, as a mask for etching the silicon oxide layer, a photoresist pattern was formed. An exposure step of the photoresist pattern was carried out using an interference exposure method. Here, because WSi is used in the multilayer mask, light returned by the rear surface in exposure becomes strong. Therefore, the returned light and incident light interfere with each other, and thus, there is generated a problem in that the sectional shape of the photoresist after the exposure and the development does not become a rectangle. Therefore, a BARC layer 23 was provided to absorb the returned light by the rear surface so that the sectional shape of the photoresist after the exposure and the development becomes a rectangle. The photoresist used here was UV-170 manufactured by Shipley Company. The BARC used here was AZ Exp. KrF-17C8 manufactured by Clariant Company. The respective materials were spin coated on the substrate having the multilayer mask materials formed thereon. The BARC was prebaked at 180° C. for one minute, and the film thickness here was 115 nm. The photoresist was prebaked at 100° C. for two minutes, and the film thickness here was 140 nm.

Figure 5B:
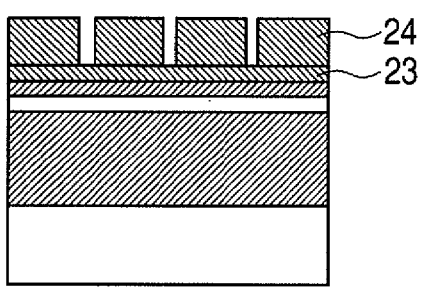

Then, the substrate was exposed to light by using two-beam interference exposure method. A light source had a wavelength of 266 nm which is fourth harmonic of Nd-YAG (Neodymium : yttrium-aluminum-garnet) was used. The angle of incidence on the substrate was 56°. Laser beams were expanded by 100 times by a beam expander. The amount of exposure was 30 mJ/cm$^2$. In the case of three-beam interference exposure, it is possible to form the hole pattern in Example 1. After the exposure, PEB (Post Exposure Bake) was carried out at 120° C. for 1.5 minutes. Then, after the substrate was soaked in a solution containing 2.38% of TMAH (Tetra Methyl Ammonium hydroxide) for 30 seconds, the solution was rinsed out by pure water shower to obtain a photoresist pattern 24 (FIG. 5B). Here, a pattern effective area of 35 mm×35 mm was able to be secured.

Figure 5C:
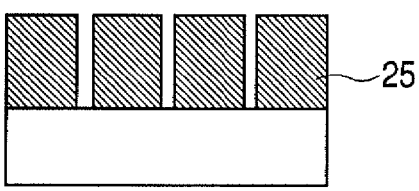
Figure 5D:
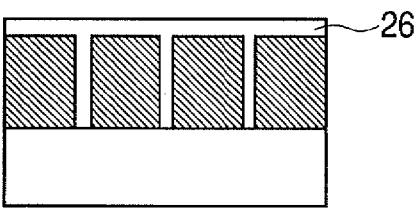
Figure 5E:
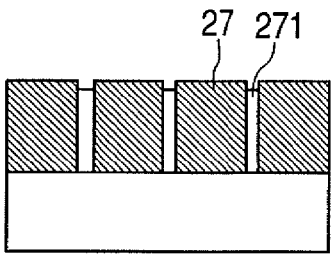
Figure 5F:
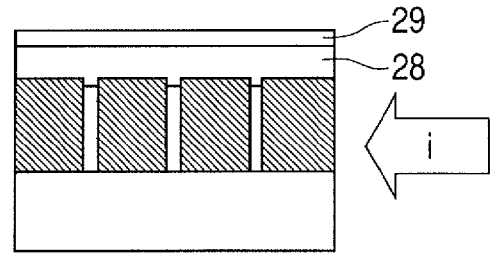

Then, the BARC, silicon oxide, WSi, and tantalum pentoxide layers were etched. The etching was carried out using an ICP apparatus. The BARC and silicon oxide layers were etched using an etching gas similar to that in Example 1 under similar etching conditions. The WSi layer was etched with a mixed gas of $SF_6$ and chlorine at a ratio of 1:2 under a pressure of 2.7 Pa with an RF power of 1.5 W/cm$^2$ for 40 seconds. After that, the tantalum pentoxide layer was etched with $SF_6$ as an etching gas and with a bias of 20 W applied on the substrate side under a pressure of 6 Pa with a power of 1.2 W/cm$^2$ for 50 minutes to obtain a line-and-space structure 25 of tantalum pentoxide (FIG. 5C). Here, the lines, the spaces, and the pitch of the line-and-space structure were 130 nm, 30 nm, and 160 nm, respectively. Then, filling and planarizing steps were carried out. The filling step was carried out similarly to the case of Example 1. As a result, a filled substrate on which a planarized interface 26 of the filling layer was obtained at a position of 50 nm above an upper surface of the tantalum pentoxide pattern was obtained (FIG. 5D). Then, the planarizing process was carried out in a way similar to that in Example 1 for 5.6 minutes. As a result, a planarized substrate was obtained, in which side surfaces 271 of the tantalum pentoxide structure were exposed by 5 nm in height from an upper surface of the sacrificial layer to the upper surface 27 of the tantalum pentoxide structure. Then, the second layer and the third layer were formed (FIG. 5E). After vacuum vapor deposition was carried out to evaporate a tantalum pentoxide layer 28 to have a thickness of 24 nm, a silicon oxide layer 29 was evaporated to have a thickness of 10 nm (FIG. 5F).

Figure 5G:
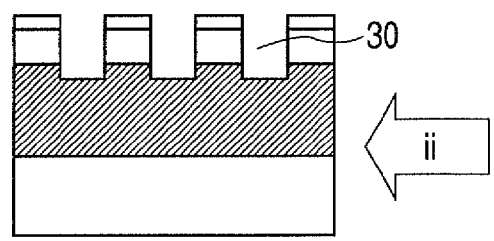

After that, a multilayer mask was formed, and a photoresist pattern was formed in a way similar to the case of the first layer by using an interference exposure method. The amount of exposure here was 25 mJ/cm$^2$. After that, in a way similar to the case of the first layer, the multilayer mask, the silicon oxide layer, and the tantalum pentoxide layer were etched. The etching of the silicon oxide layer and the tantalum pentoxide layer was carried out at the same time under conditions similar to those of the etching of tantalum pentoxide of the first layer. The etching time was 1.5 minutes. FIG. 5G shows a schematic cross-sectional view at that time. The schematic cross-sectional view is a cross-sectional view seen from the direction indicated by the arrow i of FIG. 5F. This illustrates that the pattern in the first layer and the pattern in the second layer are orthogonal to each other. Here, the lines, the spaces, and the pitch of the line-and-space structure 30 were 96 nm, 64 nm, and 160 nm, respectively.

Figure 5H:
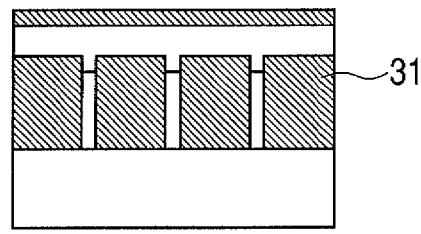
Figure 5I:
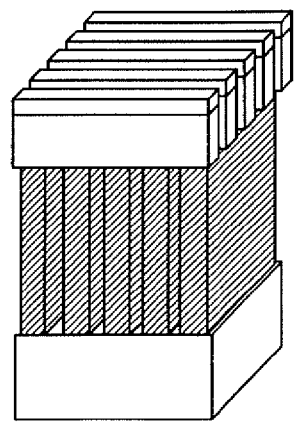

Then, similarly to the case of Example 1, the sacrificial layer was ashed to obtain a three-dimensional optical element having a hollow structure 31 (FIG. 5H). This schematic cross-sectional view of FIG. 5H is a view seen from the direction indicated by the arrow ii of FIG. 5G. With regard to all the nine patterns in the 6-inch surface, the 35 mm×35 mm areas where the patterns were formed appeared to be uniform, and, even after nitrogen blow of 0.5 MPa was carried out, the appearance did not change, and it was a satisfactory structure. Further, observation of a section taken along the center of the pattern with an FE-SEM (Field Emission-Scanning Electron Microscope) confirmed that, at the interface between the first layer and the second layer, the two layers were strongly adhered to each other.

Figure 6:
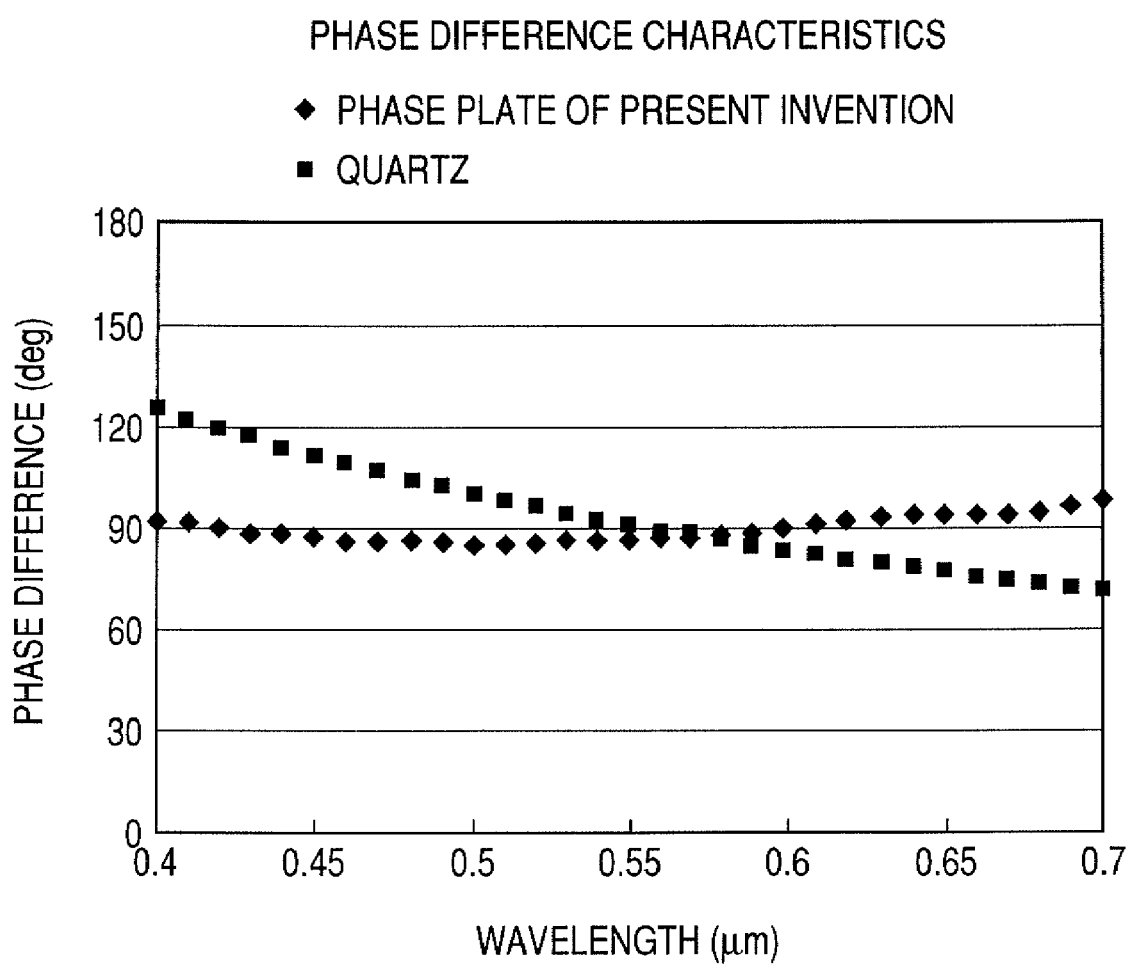
FIG. 6 is a graph for comparing phase difference characteristics of a phase plate according to Example 3 of the present invention with phase difference characteristics of a phase plate made of quartz.

The optical element according to this example functions as a phase plate. FIG. 6 is a graph for comparing phase difference characteristics of a phase plate according to this example with phase difference characteristics of a commonly used phase plate made of quartz. Solid black squares in FIG. 6 illustrate phase difference characteristics of a conventional quartz phase plate while solid black circles illustrate phase difference characteristics of the phase plate having the structure illustrated in FIG. 5I. The result shows that a change in the phase difference of the phase plate according to this example in the visible range is smaller than that of the phase plate made of quartz, and thus, the phase plate according to this example is excellent in optical characteristics. FIG. 7 shows the result of measurement of average transmittance in the visible range. FIG. 7 shows that the average transmittance in the visible range is near 100%, and thus, an antireflective effect can be obtained at the same time. The antireflective effect is thought to be efficiently exhibited when the structure of silicon oxide provided in the last layer functions as a layer having a low refractive index.

EXAMPLE 4

In Example 4, an optical glass substrate similar to the above-mentioned one in Example 3 was used and a titanium oxide layer was formed by sputtering to have a thickness of 360 nm. Then, similarly to the case of Example 3, a multilayer mask was formed thereon by sputtering. The multilayer mask was composed of chromium in a thickness of 50 nm and silicon oxide in a thickness of 80 nm. Then, similarly to the case of Example 3, after a BARC and a photoresist were applied, patterning and etching were carried out to obtain a structure of a first layer, provided that the angle of incidence on the substrate of interference exposure was 72°, the amount of exposure was 35 mJ/cm$^2$, and chromium was etched with a mixed gas of chlorine and oxygen at a ratio of 1:3 used as an etching gas and with a bias of 120 W applied on the substrate side under a pressure of 6 Pa with an RF power of 50 W for one minute and forty seconds. The titanium oxide layer was etched for 25 minutes. In this way, the structure of the first layer was obtained. Here, the lines, the spaces, and the pitch of the line-and-space structure of the first layer were 30 nm, 110 nm, and 140 nm, respectively.

Then, filling and planarizing steps were carried out similarly to the case of Example 3. In the filling step, a similar material was used, and, after spin coating was carried out at 1000 rpm for 30 seconds, prebaking was carried out at 180° C. for one minute. This was repeated two times to complete the filling. As a result, a planarized interface of the filling layer was obtained at a position of 200 nm above an upper surface of the titanium oxide pattern. The planarization was carried out similarly to the case of Example 3, and ashing was carried out for 22 minutes. The result of measurement by an AFM of the exposed amount of titanium oxide at the respective centers of the nine patterns on the 6-inch optical glass substrate illustrated in FIG. 2 was 20 nm with regard to patterns 6-1, 6-3, 6-7, and 6-9, 15 nm with regard to patterns 6-2, 6-4, 6-6, and 6-8, and 10 nm with regard to a pattern 6-5.

Then, a second layer was formed. Similarly to the case of the first layer, the second layer was formed with using a sputtering method by forming a film of titanium oxide with a thickness of 70 nm and, forming a multilayer mask composed of a chromium layer with a thickness of 50 nm and a silicon oxide layer with a thickness of 80 nm. Then, a resist pattern was formed. The amount of exposure was 18 mJ/cm$^2$. The structure of the second layer was formed under conditions similar to those of the first layer except that the etching time of titanium oxide was five minutes. The lines, the spaces, and the pitch of the line-and-space structure of the second layer were 120 nm, 20 nm, and 140 nm, respectively.

Then, similarly to the case of Example 3, a sacrificial layer was ashed to form a hollow structure of the first layer. Further, the filling and planarizing processes similarly to the case of the first layer were carried out. A titanium oxide layer having a thickness of 360 nm was formed on the substrate by sputtering. The third titanium oxide layer was patterned similarly to the case of the first layer. The lines, the spaces, and the pitch of the line-and-space structure were, similarly to the case of the first layer, 30 nm, 110 nm, and 140 nm, respectively. Finally, similarly to the case of the first layer, a sacrificial layer was ashed to form a hollow structure of the second layer. The process of forming the third layer could be carried out to form a continuous film thereon, even when the third film was directly formed without using the process of forming a sacrificial layer, because the spaces of the second layer were small.

With regard to all the nine patterns in the 6-inch surface, the 35 mm×35 mm areas where the patterns were formed appeared to be uniform, and, even after nitrogen blow of 0.5 MPa was carried out, the appearance did not change, and it was a satisfactory structure. Further, observation of a section taken along the center of the pattern with an FE-SEM confirmed that, at the interface between the first layer and the second layer, the two layers were strongly adhered to each other, and, at the interface between the second layer and the third layer, the two layers were strongly adhered to each other. Then, the obtained substrate of a three-layered structure was scribed to carve out a rectangle of 28.3×20 mm, and nine substrates having the three-dimensional structure were formed. Each of the nine substrates was stuck to an S-TIH53 substrate.

Figure 8A:
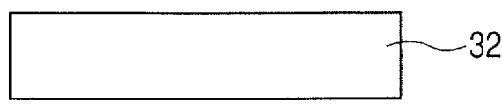
FIGS. 8A, 8B, 8C and 8D are schematic views for illustrating a process for sticking a substrate to a prism according to Example 4 of the present invention.
Figure 8B:
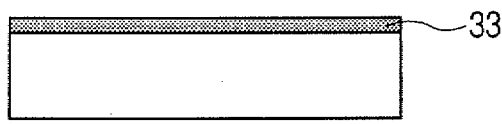
Figure 8C:
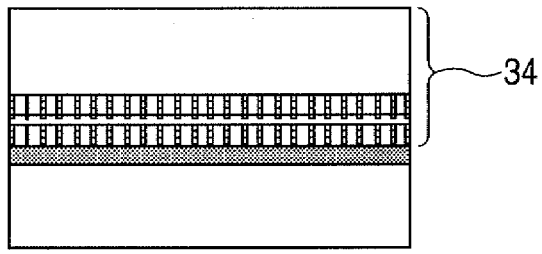
Figure 8D:
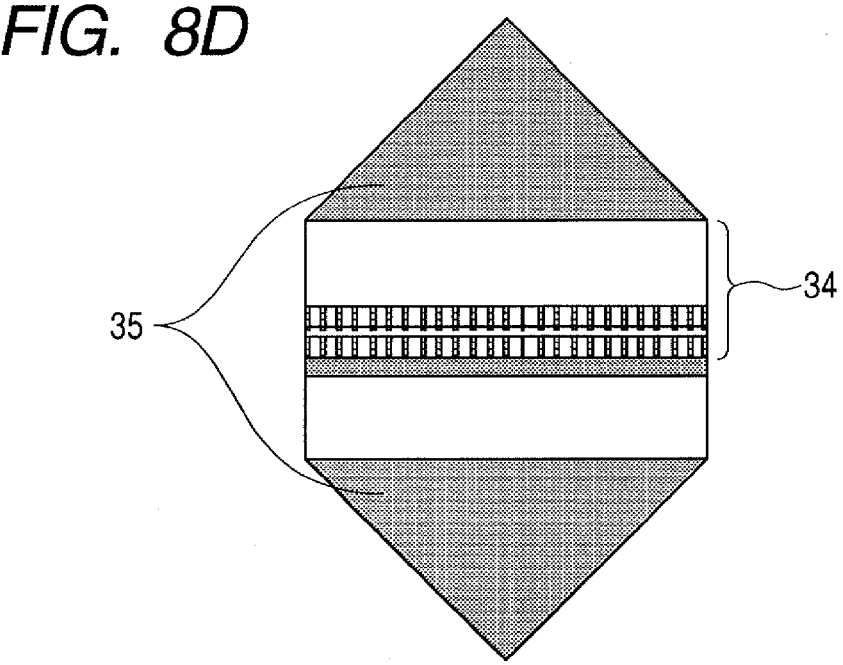

FIGS. 8A to 8D are schematic views for illustrating a process for bonding the substrates. First, an S-TIH53 substrate 32 was cleaned (FIG. 8A). Then, an adhesive layer was spin coated and temporary curing was carried out. As the adhesive, PLENACT KR-55 which is a titanate coupling agent and manufactured by Ajinomoto-Fine-Techno Co., Inc. diluted by a factor of 60 with isopropyl alcohol was used. The spin coating was carried out at 5000 rpm for 30 seconds and the temporary curing was carried out at 180° C. for two minutes to obtain the substrate with an adhesive layer 33 (FIG. 8B). Then, the above-mentioned scribed substrate 34 having the three-dimensional structure was overlaid on the adhesive layer such that the portion having the structure portions is in contact with the adhesive layer. Then, the overlaid substrate was left on a hot plate under a load of 2 kg for five minutes at 200° C. (FIG. 8C). After the substrate was cooled, the substrate was adhered to 45° prisms 35 made of S-TIH53 so as to be sandwiched therebetween, and a prism was obtained (FIG. 8D).

Figure 9:
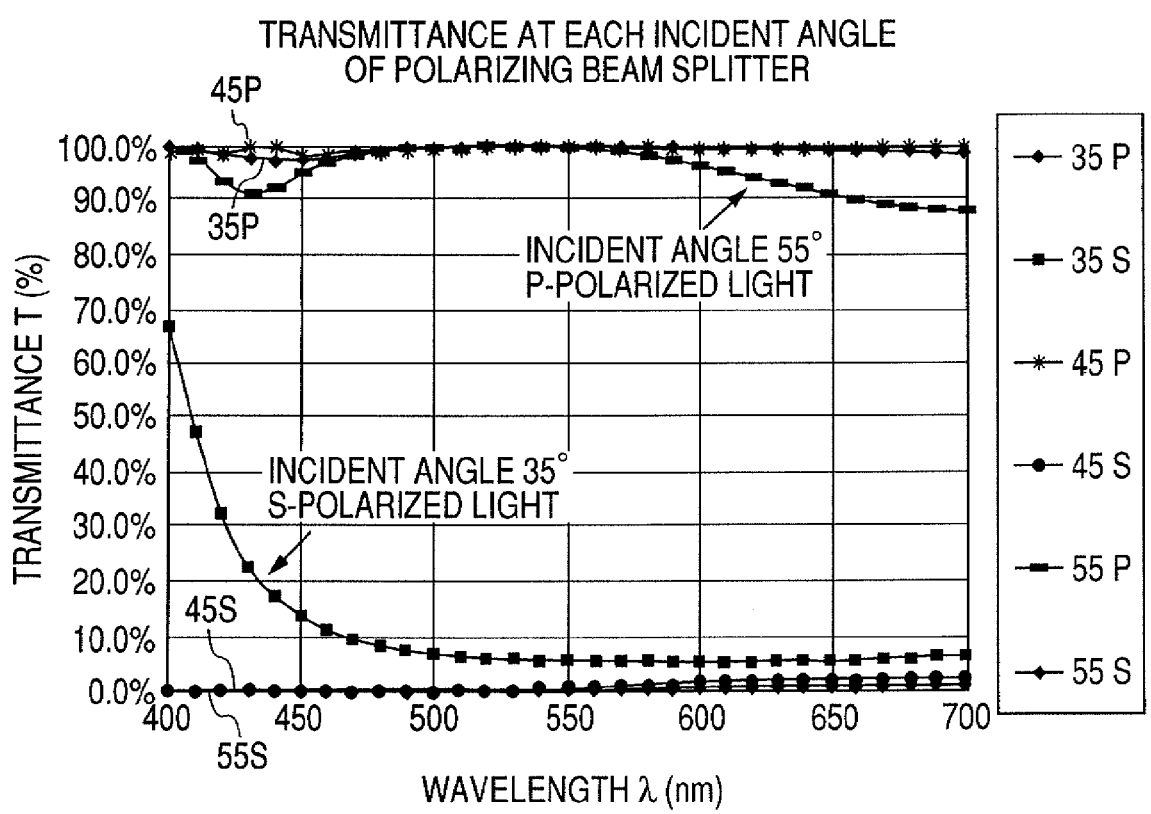
FIG. 9 is a graph illustrating spectral transmittance of S-polarized light and P-polarized light of a polarizing beam splitter according to Example 4 of the present invention.
Figure 10:
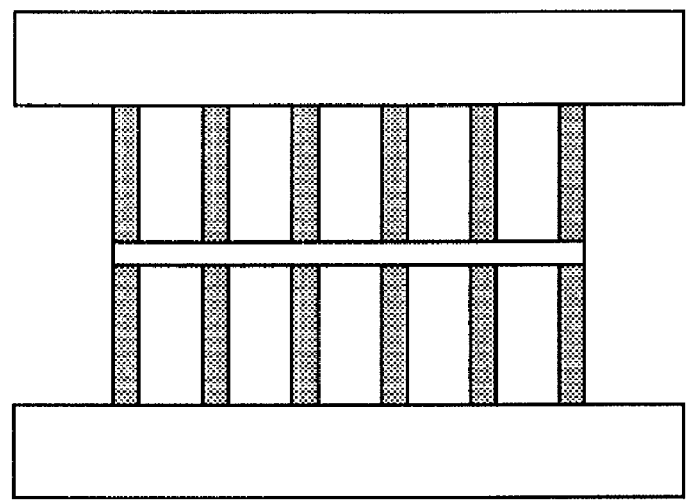
FIG. 10 is a diagram illustrating another example of an optical element according to Example 4 of the present invention.

The optical element according to this example functions as a polarizing beam splitter. FIG. 9 illustrates spectral transmittance of S-polarized light and P-polarized light with regard to incident angles of 45°±10° of the prism according to this example. As illustrated in FIG. 9, there was no problem except that the transmittance of S-polarized light was increased when the incident angle was 35° and the transmittance of P-polarized light was decreased when the incident angle was 55°. In particular, when the incident angle was 45°±5°, the characteristics hardly changed, and it can be seen that the optical element according to this example was excellent in optical characteristics (Because the characteristics at the incident angles of 40° and 50° were the same as those at the incident angle of 45°, the plotting of the characteristics at the incident angles of 40° and 50° were omitted in FIG. 9). Although the three-dimensional structure is formed to the ends of the substrate in FIG. 8, there may be a space between an end of the substrate and a structure as illustrated in FIG. 10. Because such a configuration can secure a space at an element opening, thermal damage due to an abrupt temperature change can be alleviated and gas discharge from a bonded part can be suppressed. This enables a more stable projected image in terms of environmental circumstances to be obtained.

COMPARATIVE EXAMPLE 1

In Comparative Example 1, in a process of planarizing a filled layer of a first layer, ashing was carried out for 20 minutes. Here, the result of measurement by an AFM of the exposed amount of titanium oxide at the respective centers of nine patterns on the 6-inch optical glass substrate illustrated in FIG. 2 was 1 nm with regard to patterns 6-1, 6-3, 6-7, and 6-9; −4 nm with regard to patterns 6-2, 6-4, 6-6, and 6-8; and −9 nm with regard to a pattern 6-5. Here, the minus values indicate that titanium oxide was not exposed and a sacrificial layer remained on the surface thereof. After that, processes similar to those of Example 4 were carried out. In the patterns 6-2, 6-4, 6-6, 6-8, and 6-5, light scattering was caused after the sacrificial layer was ashed. As a result of measuring a section of a defect portion with an FE-SEM, the titanium oxide layer of a second layer had a defect on the entire surface in a minute area. Further, because there was no inconvenience in terms of the appearance, the patterns 6-1, 6-3, 6-7, and 6-9 were sandwiched between prisms. During standing at 200° C. in a step of post-baking an adhesive, peeling off from an interface was observed.

COMPARATIVE EXAMPLE 2

In Comparative Example 2, planarization for 6.1 minutes was carried out. In this case, the amount of exposure of tantalum pentoxide was 25 nm. Under the conditions similar to those of Example 3 except for the above, a phase plate was obtained. As a result, the phase plate was apparently in a fogged state. Further, when spectral transmittance was measured, it was confirmed that, as illustrated by solid black triangles in FIG. 7, the transmittance was decreased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-052013, filed Feb. 28, 2006, and Japanese Patent Application No. 2007-032708, filed Feb. 13, 2007, which are hereby incorporated by reference herein in their entirety.

What is claimed is:

1. An optical element comprising:
a substrate; and
a first layer formed on the substrate; and
a second layer formed on the first layer,
wherein the first layer comprises a repetition structure of spaces and linear structural parts at a pitch equal to or less than a wavelength of visible light,
wherein the second layer comprises a repetition structure of spaces and linear structural parts at a pitch equal to or less than a wavelength of visible light,
wherein the linear structural parts of the second layer are formed so as to cross over the spaces of the first layer,
wherein the linear structural parts of the first layer are elongated in a direction so as to contact multiple linear structural parts of the second layer, and
wherein upper portions of the structural parts of the first layer and lower portions of the structural parts of the second layer engage into each other in a range of 3 nm or more and 20 nm or less.

2. An optical element according to claim 1, further comprising a plurality of layers between the substrate and the first layer, wherein the first layer is formed of an i-th layer and the second layer is formed of an (i+1)th layer counting from the substrate.

3. An optical element according to claim 1, wherein the pitch equal to or less than the wavelength of visible light in the first layer and the second layer is 10 nm or more and 200 nm or less.

4. An optical element according to claim 1, wherein the repetition structure of the first layer and the repetition structure of the second layer are formed of the same material.

5. An optical element according to claim 1, wherein the repetition structure of the first layer and the repetition structure of the second layer are formed of a dielectric material.

* * * * *